United States Patent [19]

Brown

[11] 4,012,115
[45] Mar. 15, 1977

[54] SAWTOOTH SHAPED FRONT SCREEN

[75] Inventor: John Brown, Flemington, N.J.

[73] Assignee: Qantix Corporation, Flemington, N.J.

[22] Filed: July 10, 1975

[21] Appl. No.: 594,721

[52] U.S. Cl. .............................. 350/128; 350/106; 350/109; 350/167

[51] Int. Cl.² ........................................ G03B 21/60

[58] Field of Search .......... 350/127, 128, 129, 167, 350/106, 109

[56] References Cited

UNITED STATES PATENTS

| 3,782,805 | 1/1974 | Brown | 350/128 |
| 3,846,012 | 11/1974 | Brown | 350/128 |
| 3,893,748 | 7/1975 | DePalma et al. | 350/128 |

*Primary Examiner*—Richard A. Wintercorn
*Attorney, Agent, or Firm*—Lerner, David, Littenberg & Samuel

[57] ABSTRACT

A transparent front projection screen is disclosed having a plurality of ridges on the back thereof interrupted by flat portions and a plurality of curved sawtooth shaped ridges on the front thereof. The back ridges serve as a prism like element for reflecting the light by internal reflection which is incident thereon from predetermined directions. The flat surfaces on the back of the screen pass light incident from certain undesired directions. The sawtooth shaped ridges on the front of the screen serve as elements for developing a vertical spread of light but eliminates front face reflection problems.

The disclosure also teaches the proper location of a projector when used with a transparent front projection screen as described above.

12 Claims, 3 Drawing Figures

SAWTOOTH SHAPED FRONT SCREEN

FIELD OF THE INVENTION

This invention relates to front projection screens and particularly to front projection screens having a transparent front light receiving portion.

BACKGROUND OF THE INVENTION

In my prior U.S. Pat. No. 3,782,805, a transparent front projection screen is disclosed and claimed which efficiently uses the light provided by a projector but does not reflect undesirable images to the audience and is viewable from positions other than directly in front of the screen. The projection screen thus taught has proved to be extremely significant and has demonstrated remarkable results with respect to the ability to reflect back to an audience only light incident upon the screen from a small predetermined horizontal angle, while permitting light from outside that horizontal angle to pass therethrough. My U.S. Pat. No. 3,966,301 discloses a screen similar to the one described in my prior U.S. Pat. No. 3,782,805, but has the additional feature of flat portions on the back surface thereof in areas not employed for reflecting light to pass additional ambient light from the preferred horizontal angular direction but falling outside of a preferred vertical number of directions. This screen is an improvement on the screen described and claimed in my prior U.S. Pat. No. 3,782,805 with regard to rejection of non-wanted ambient light.

It has been found that a further source of unwanted reflection due to ambient light results from reflections from the front surface of the transparent screens referred to in the above-mentioned patent and patent applications. While approximately 92% of either projected or ambient light which impinges on the front surface of the screen penetrate that surface and are dealt with by the back surfaces discussed in detail in my above-mentioned patent and patent application, about 8% is reflected by the front surface thereof. This phenomonon referred to as front face reflection, produces an objectionable glare based upon projected light alone to a viewer situated in a position which falls on a line which extends between the surface of the screen and the projection lens. The glare from the projected light will appear as a vertical line on the screen.

It should be appreciated that in a well-lighted room, the front face reflection from ambient light, while being only 8% of the light incident upon the screen, can have a high power content compared with the projected light.

U.S. Pat. No. 2,974,564, which issued Mar. 14, 1961, to W. S. Miller and is entitled PROJECTION SYSTEMS, discloses a system for eliminating glare from front face reflection of a coated screen in which a front projection screen having a transparent front surface coating has reflecting surfaces spaced therebehind which are inclined or tilted with respect to the flat transparent front surface.

Since the front surface of the Miller screen is flat, the screen itself is mounted so that the front surface is included or tilted with respect to the viewing area thus deflecting the glare reflected from the front face into a non-viewing area. The tilt of the projection screen is arranged so that the reflecting surfaces are canted with respect to the projected light to provide the projected image in the viewing area. Therefore, the projector must be in an area other than by the viewing area and the tilted reflecting surfaces project the light into the viewing area. As a result of the tilting of the screen, the tilted reflecting surfaces require intricate and unusual shapes in order to obtain equal intensity across the face of the screen.

A major disadvantage of the Miller system which is a result of the tilting thereof, is the large area required to create a suitable viewing area free of front face reflection, including the area required for the screen, as well as the separate area required for the projector.

BRIEF DESCRIPTION OF THE INVENTION

In accordance with the teachings of this invention, a front projection screen is provided which has a transparent front light receiving surface and reflecting means spaced therefrom. The front projection screen is characterized in that a plane, intersecting both the transparent front light receiving surface and the reflecting means intersects the reflecting means in a straight line and the transparent front light receiving surface in a line at least a portion of which is tilted with respect to the straight line. In this way, a front projection screen, having a transparent front light receiving surface is provided which eliminates the problem of front face reflection and can be mounted normal to the projected light.

In the preferred embodiment of this invention the line of interception is a sawtooth shaped line having curved sides to angularly spread light received from a given direction.

The preferred embodiment employs as the reflecting means, light transmitting material having a predetermined critical angle of internal reflection less than 45° in which a plurality of parallel ridges are formed on a back surface thereof, each of said plurality of parallel ridges has curved sides terminating at a peak. The curved sides extend away from the back surface at an angle equal to or greater than 45° immediately adjacent to said back and the angle between a line tangent to said sides and said back surface continuously decreases as said curved sides extend towards said peak. The angle between a line tangent to said sides and said back surface is greater than or equal to said predetermined critical angle of internal reflection at said peak but less than 45°.

The preferred embodiment also is arranged so that the ridges having tilted portions are disposed perpendicularly to the ridges on the back surface and the parallel ridges formed on the back surface are intermittently interrupted by a plurality of repeating planar surfaces formed parallel to the ridges having the tilted portions.

DESCRIPTION OF THE DRAWINGS

For a more complete understanding of the invention, reference should be made to the following detailed description and drawings in which.

DETAILED DESCRIPTION OF THE INVENTION

The disclosure of my prior U.S. Pat. No. 3,782,805, and patent application entitled TRANSPARENT SCREEN HAVING FLAT PORTIONS FOR REDUCING REFLECTION FROM AMBIENT LIGHT filed Dec. 19, 1974, and afforded Ser. No. 534,297, are incorporated herein by reference as though fully set forth herein.

Figure 1:
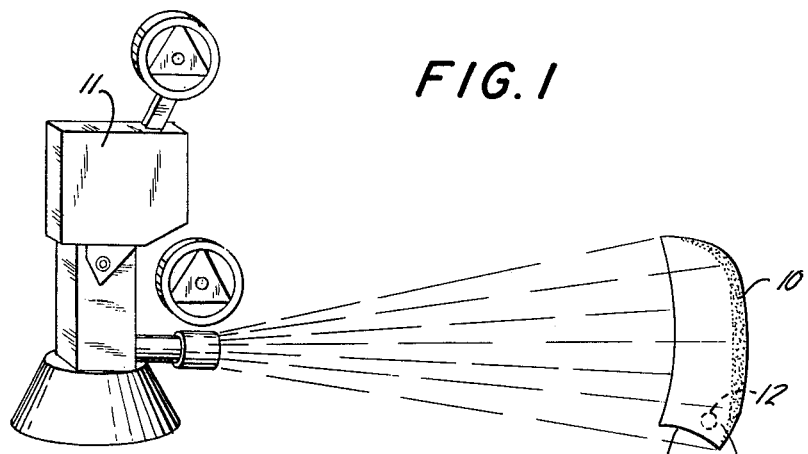
FIG. 1 is an isometric view showing a projection system in accordance with the teachings of this invention.

Referring now to FIG. 1, we see a front projection screen 10 mounted in front of a viewing area. A projector 11 is positioned to project light onto the front face of the screen 10 from a position immediately adjacent to the bottom edge of the viewing area.

Figure 2:
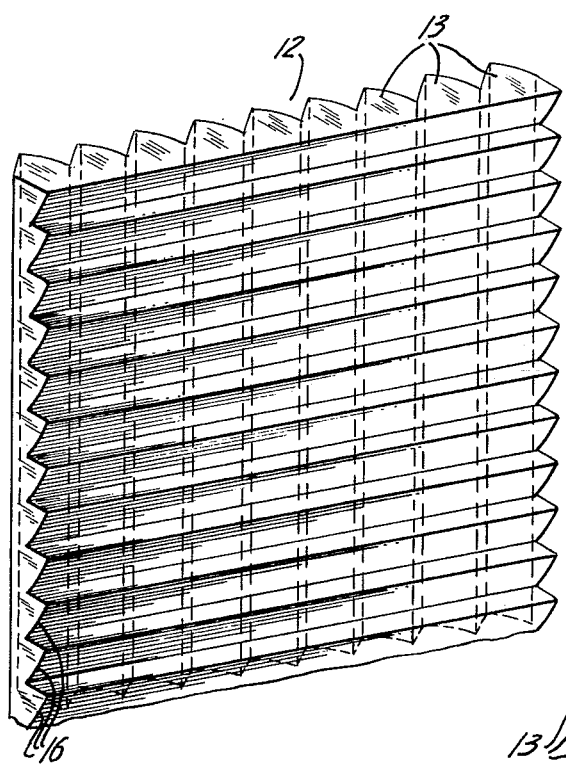
FIG. 2 is a front view of a portion of a screen shown in FIG. 1 embodying the principles of this invention.
Figure 3:
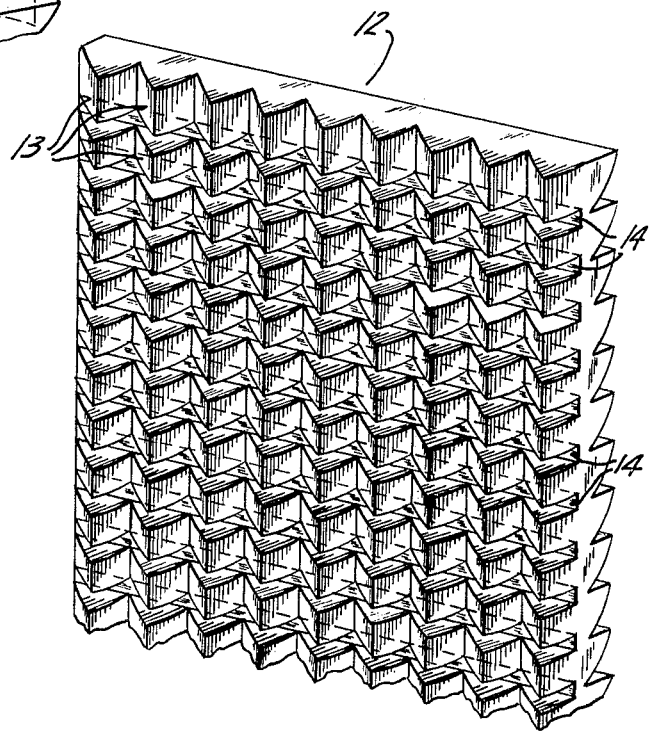
FIG. 3 is a back view of the portion of the screen shown in FIG. 2.

Referring now to FIGS. 2 and 3, we see the details of the construction of the front and back of a representative portion 12 of the screen 10. The screen 10 is manufactured from a light transmitting material which has a predetermind critical angle of internal reflection less than 45°. A plurality of parallel ridges 13 are formed on the back surface of the screen 10. Each of the plurality of the parallel ridges 13 have curved sides terminating at a peak. The curved sides extend away from the back surface at an angle equal to or greater than 45° immediately adjacent to the back surface. The angle between a line tangent to the sides and the back surface continuously decreases as the curved sides extend towards the peaks. The angle between a line tangent to the sides and the back surface is greater than or equal to the predetermined critical angle of internal reflection at the peaks but less than 45°. The plurality of parallel ridges 13 serve as reflectors as described more fully in my prior U.S. Pat. No. 3,782,805.

The ridges 13 are intermittently interrupted by a plurality of planar surfaces 14. The planar surfaces 14 are interposed at positions where projected light incident upon the front of the screen would not be focused for reflection. In this way, certain ambient light passing through the screen 10 will pass through the flat portions 14 and not be sent back to the viewing area. For a more complete understanding of the function and positioning of the flat planar surfaces 14, reference should be made to my co-pending patent application, Ser. No. 534,297 filed Dec. 19, 1974, referred to above.

The front surface of the screen 10 has a plurality of parallel ridges 16 each of which is a section of a cylinder. In my prior screens, the front ridges (corresponding to the ridges 16) were continuous sections of cylinders and had no abrupt changing surfaces. In this application the front ridges 16 terminate when a line tangent thereto is parallel to the main body of the screen 10. The material then returns to the screen to form the beginning of the next adjacent ridge. In this way, a sawtooth shaped front surface is achieved with curved tilted portions. The curvature of the ridges 16 in the form of the section of a cylinder provide vertical dispersion of projected light as discussed in my prior patent and patent application referred to above.

It can be seen therefore that a plane perpendicular to the screen 10 which passes through a peak of a ridge 13 will intersect the ridge in a straight line and the front surface of the screen 10 in a sawtooth shape pattern in which portions thereof will be tilted with respect to the straight line.

As a result of the structure discussed above, light coming from the projector 11 which does not pass through the front surface of the screen 10, but rather is reflected thereby, will be deflected downward by the tilted portions of the ridges 16 if they emanate from a position below the lower edge 17 of the screen 10. Therefore by mounting the projector 11 slightly below this level, all of the light reflected by the front face of the screen 10 will be deflected downwardly and not into a viewing area in front of the screen 10. Light transmitted through the front surface of the screen 10 will be reflected back towards the viewing area (as defined by the curvature of the ridges 13 and 16). By employing the tilted curved front faced ridges 16, the screen differentiates between light which is reflected off the front surface by deflecting it downwardly and light which goes through the screen and is reflected off the ridges 13 by internal reflection which is reflected generally back towards the projector.

While this invention has been described with respect to a particular embodiment thereof, numerous others will become obvious to those of ordinary skill in the art in lights thereof.

What is claimed is:

1. A front projection screen having a transparent front light receiving surface and reflecting means spaced from said transparent front light receiving surface for reflecting light incident thereon through said transparent front light receiving surface back through said transparent front light receiving surface; said front projection screen being characterized in that a plane intersecting said transparent front light receiving surface and said reflecting means intersects said reflecting means in a straight line and said transparent front light receiving surface in a line at least a portion of which is tilted with respect to said straight line.

2. The front projection screen as defined in claim 1 in which said transparent front light receiving surface includes a plurality of parallel sawtooth shaped ridges; each of said plurality of sawtoothed shaped parallel ridges having a portion thereof tilted with respect to said reflecting means.

3. The front projection screen as defined in claim 2 in which said tilted portions of said parallel shaped ridges are curved to angularly spread light received from a given direction.

4. The front projection screen as defined in claim 1 in which the reflecting means includes light transmitting material having a predetermined critical angle of internal reflection less than 45° in which a plurality of parallel ridges are formed on a back surface thereof, each of said plurality of parallel ridges having curved sides terminating at a peak; said curved sides extending away from said back surface to an angle equal to or greater than 45° immediately adjacent to said back surface; the angle between a line tangent to said sides and said back surface continuously decreasing as said curved sides extend towards a peak; the angle between a line tangent to said sides and said back surface being greater than or equal to said predetermined critical angle of internal reflection at said peaks but less than 45°.

5. The front projection screen as defined in claim 4 in which said ridges having tilted portion are disposed perpendicularly to said ridges on said back surface; and said parallel ridges formed on said back surface are intermittently interrupted by a plurality of repeating planar surfaces formed parallel to said ridges having said tilted portions.

6. A front projection screen as defined in claim 5 in which said ridges having said tilted portions are curved to form a section of a cylinder having a predetermined focal length.

7. A front projection system including:
 a front projection screen having a top and a bottom mounted with said bottom in a predetermined position; said front projection screen having a transparent front light receiving surface and reflecting means spaced from said transparent front light receiving surface, for reflecting light incident thereon through said transparent front light receiving surface back through said transparent front light receiving surface; said front projection screen being characterized in that a plane intersecting said transparent front light receiving surface and said reflecting means intersects said reflecting means in a straight line and said transparent front light receiving surface in a line at least a portion of which is tilted with respect to said straight line; and
 projection means for projecting light onto and normal to said front projection screen; said projection means being mounted below said bottom of said front projection screen.

8. The front projection screen as defined in claim 7 in which said transparent front light receiving surface includes a plurality of parallel sawtooth shaped ridges; each of said plurality of sawtoothed shaped parallel ridges having a portion thereof tilted with respect to said reflecting means.

9. The front projection screen as defined in claim 8 in which said tilted portions of said parallel shaped ridges are curved to angularly spread light received from a given direction.

10. The front projection screen as defined in claim 9 in which the reflecting means includes light transmitting material having a predetermined critical angle of internal reflection less than 45° in which a plurality of parallel ridges are formed on a back surface thereof, each of said plurality of parallel ridges having curved sides terminating at a peak; said curved sides extending away from said back surface at an angle equal to or greater than 45° immediately adjacent to said back surface;

11. The front projection screen as defined in claim 10 in which said ridges having tilted portion are disposed perpendicularly to said ridges on said back surface; and said parallel ridges formed on said back surface are intermittently interrupted by a plurality of repeating planar surfaces formed parallel to said ridges having said tilted portions.

12. A front projection screen as defined in claim 11 in which said ridges having said tilted portions are curved to form a section of a cylinder having a predetermined focal length.

* * * * *